(12) United States Patent
Xu et al.

(10) Patent No.: US 8,160,587 B2
(45) Date of Patent: Apr. 17, 2012

(54) RADIO ACCESS TERMINAL, BASE STATION CONTROLLER, AND HANDOFF CONTROL METHOD IN RADIO COMMUNICATION SYSTEM

(75) Inventors: Dan Xu, Fujisawa (JP); Yuichiro Katsu, Yokohama (JP); Tsutomu Uchida, Yokohama (JP); Shiro Mazawa, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 379 days.

(21) Appl. No.: 12/423,049

(22) Filed: Apr. 14, 2009

(65) Prior Publication Data

US 2009/0264134 A1 Oct. 22, 2009

(30) Foreign Application Priority Data

Apr. 14, 2008 (JP) ................. 2008-104227

(51) Int. Cl.
*H04W 36/00* (2009.01)
(52) U.S. Cl. .................. 455/436; 455/439; 455/440
(58) Field of Classification Search .................. 455/438, 455/439, 432.1, 432.3, 433, 435.2, 435.3, 455/436, 437, 440

See application file for complete search history.

(56) References Cited

U.S. PATENT DOCUMENTS

| | | | | |
|---|---|---|---|---|
| 5,546,445 A | * | 8/1996 | Dennison et al. | 455/408 |
| 6,321,090 B1 | * | 11/2001 | Soliman | 455/440 |
| 6,725,050 B1 | * | 4/2004 | Cook | 455/456.1 |
| 6,876,853 B2 | * | 4/2005 | Hokkanen | 455/440 |
| 7,542,766 B2 | * | 6/2009 | Kobayashi et al. | 455/440 |
| 7,546,111 B2 | * | 6/2009 | Nakano | 455/404.1 |
| 7,929,969 B2 | * | 4/2011 | Lee et al. | 455/439 |
| 2007/0060126 A1 | * | 3/2007 | Taniguchi et al. | 455/436 |
| 2007/0202866 A1 | | 8/2007 | Tsuchiya | |
| 2009/0232098 A1 | | 9/2009 | Makabe | |

FOREIGN PATENT DOCUMENTS

| | | |
|---|---|---|
| JP | 09-261711 | 10/1997 |
| JP | 10-098759 | 4/1998 |
| JP | 2001-112041 | 4/2001 |
| JP | 2002-232928 | 8/2002 |
| JP | 2003-199137 | 7/2003 |
| JP | 2003-284115 | 10/2003 |
| WO | WO 00/28774 | 5/2000 |
| WO | WO 2005/112490 | 11/2005 |
| WO | WO 2008/013026 | 1/2008 |

OTHER PUBLICATIONS

"Femoto Access Control Provisioning and Enhanced System Selection", Airvana, Nov. 5, 2007.

* cited by examiner

*Primary Examiner* — Jean Gelin
(74) *Attorney, Agent, or Firm* — Antonelli, Terry, Stout & Kraus, LLP.

(57) ABSTRACT

In a radio communication system wherein radio frequencies for communicating with a radio terminal are different in radio base stations, a table in which positional information, information on the frequency used for transmission/reception to/from the terminal, and a decision condition in a handoff operation are stored as to each base station is prepared in a base station controller beforehand. When the positional information is received from the radio terminal, the base station controller selects the base station being a handoff candidate, on the basis of the positional information of the radio terminal, the positional information of each base station and the decision condition of the handoff operation with reference to the table, and it transmits a handoff request message which contains the information on the frequency of the base station being the handoff candidate, to the radio terminal through the base station communicating with the radio terminal.

1 Claim, 5 Drawing Sheets

FIG.2
AT CONFIGURATION (HARDWARE)

FIG.3
CONFIGURATIONS OF BS AND BSC

FIG.4 DIAGRAM OF HANDOFF SEQUENCE IN OPERATION EXAMPLE 1

FIG.5

DIAGRAM OF HANDOFF SEQUENCE IN OPERATION EXAMPLE 2

RADIO ACCESS TERMINAL, BASE STATION CONTROLLER, AND HANDOFF CONTROL METHOD IN RADIO COMMUNICATION SYSTEM

BACKGROUND OF THE INVENTION

1. Field of the Invention

The present invention relates to radio communication technology, and more particularly to a handoff control technique in a mobile communication system wherein a frequency for a radio communication with an access terminal differs every base station.

2. Description of the Related Art

Connections from mobile terminals to the Internet have been more used year by year, and needs have been heightened, not only for browsing Web pages, but also for transmitting/receiving music and images and the like data of large capacities. In order to realize high-speed Web accesses and high-speed data communications in radio communications under such a background, studies for heightening a communication speed and widening a communication band have been rapidly promoted. In a radio communication system employing the present-day "1xEV-DO Rev. A" scheme, communications in a reverse capacity of 1.8 Mbps and a forward capacity of 3.1 Mbps are possible. In a system of the next generation, studies have been promoted for the realization of the system which, aiming at a still higher communication speed and a still wider communication band, permits communications in a reverse capacity of at least 50 Mbps and a forward capacity of at least 100 Mbps.

On the other hand, radio wave resources are finite, and the insufficient band of radio waves becomes a matter due to the increase of the number of users and the heightened speed of the communications. Also, a frequency band which each individual base station can process is definite. Therefore, when a large number of users attempt to communicate in the area of one base station, the frequency band of the radio waves becomes insufficient, and the congestion of the communications and the lowering of the data communication speed take place. In order to solve the matter, a common carrier intends to eliminate the frequency insufficiency by a method such as increasing the number of the base stations, in a city region where the users concentrate in large numbers.

Besides, a very small-sized base station called "femtocell" has recently been studied. The femtocell is a system which is configured so as to be connectable to a broadband channel by reducing the size of the base station of a portable telephone. The base stations of the femtocells are installed in underground and indoor areas into which the radio waves are difficult to enter, whereby even the areas and complicated indoor parts at which the radio waves have heretofore been difficult to arrive can be covered. In a radio communication system which is configured having the base stations of the femtocells, a countermeasure against the matter of the frequency insufficiency in the base stations is entrusted to a user side.

The femtocells which are the base stations of new frequencies are installed anew and are utilized, whereby the base stations of a plurality of different frequencies coexist in the radio communication system. In such a system in which the base stations of the different frequencies coexist, when the access terminal moves between the base stations of the different frequencies, the base station with which the access terminal communicates needs to be switched to the base station of the different frequency. This operation is called "inter-frequency handoff". In contrast, handoff in the case where the access terminal moves between the base stations which use an identical frequency is called "soft handoff".

The inter-frequency handoff includes a method of terminal-led type and a method of base station-led type. A typical example of the terminal-led type is Mobile Assist Handoff (MAHO). In the MAHO, the access terminal is always receiving the information items of neighboring base stations (the neighboring base stations here include both the base stations of the identical frequency and the different frequency) from the base station with which this access terminal is currently communicating. In the neighboring base station information items, PN information items (the identification codes of respective sectors in a CDMA system) and the frequency information items are contained as the information items on the base station neighboring the base station with which the access terminal is currently communicating.

The access terminal receives pilot signals which are successively sent in by the control channels of the respective base stations, and it reports received power values to the base station (Serving Base Station: Serving BS) with which it is currently communicating. Usually, the access terminal searches for only a neighbor pilot which is the pilot signal of the neighboring base station of the identical frequency, but it begins a search for the neighbor pilot of the neighboring base station of the different frequency, at the very limit outside the communication area. In a case where the reception power value of the neighbor pilot has exceeded a threshold value, the access terminal notifies to that effect to the base station with which it is currently communicating, by a route update message. The base station transmits to the access terminal a Traffic Channel Assignment message by which the pilot is made an active set.

On the other hand, a typical example of the base station-led type is a handoff method which uses a pilot beacon. The "pilot beacon" is a pilot signal which the neighboring base station of the frequency different from that of the serving base station transmits to the access terminal by using the same frequency as that of the serving base station. The access terminal reports the pilot reception power value from the serving base station and a reception power value from the pilot beacon, to a Base Station Controller (abbreviated to "BSC"). Besides, in a case where the reception power value from the pilot beacon has exceeded a threshold value, the BSC commands the access terminal to hand off to the neighboring base station of the different frequency.

Although the inter-frequency handoff is not concerned, Patent Document 1 (JP-A-2002-232928) and Patent Document 2 (JP-A-9-261711) disclose inventions concerning the selection of a handoff destination. Patent Document 1 proposes a soft handoff control method which uses the GPS positional information items of an access terminal, with the object of preventing any erroneous handoff ascribable to the instability of a reception power value in a multi-path environment.

Besides, in Patent Document 2, with the object of performing a search for the handoff destination efficiently in a short time, the optimum base station is decided as the handoff destination on the basis of the positional information items of an access terminal as received from a GPS for the access terminal and a database which is retained in a base station controller and in which information items on the set positions of individual base stations are stored beforehand.

SUMMARY OF THE INVENTION

In the related-art handoff stated before, the access terminal has been controlled in such a way that it successively receives the pilots of the neighboring base stations and measures the power values thereof, on the basis of the neighboring base station information items transmitted by the serving base station, and that it reports the measured power values to the serving base station.

In the case of the system in which the large number of base stations of different frequencies, such as femtocells, are existent, the number of the neighboring base stations which the base station can notify to the access terminal is limited, and hence, the information items of the neighboring base stations whose number is larger than the limit number cannot be transmitted (by way of example, the limit number is 31 in the case of the 1xEv-DO Rev. A system). In a case where, in the system of the femtocells, 99 subordinate small base stations of different frequencies exist under the base station BS1, the number of base stations exceeds the limit number, and the information items of all the neighboring base stations cannot be transmitted. Further, in the control as in the related art, the access terminal searches the base stations one by one. Therefore, when the number of the neighboring base stations is large, a long time is expended on the search process for the pilots, and a search frequency is inevitably set to be low.

Besides, the handoff expedient which uses the pilot beacon is not an effective resource utilization method because a resource corresponding to one sector is used as the pilot beacon.

Further, in the technique of Patent Document 1, in a case where base stations (BS2 and BS100) of small cover ranges exist under the serving base station (BS1), handoff does not occur when a power value from the serving base station is sufficiently large. On such an occasion, even in a case where the serving base station (BS1) is congested and where the resource of the base station BS2 leaves a margin, the access terminal cannot hand off to the base station BS2.

Still further, in the technique of Patent Document 2, a plurality of neighboring base stations whose distances from the access terminal are substantially equal can exist, and the optimum handoff cannot always proceed merely with the positional information items.

The present invention has been made in order to solve the above problems, and it has for its object to realize appropriate and efficient handoff even in a system in which a large number of base stations of different frequencies exist. Another object of the invention is to provide a method in which an access terminal need not search all neighboring base stations, but it may search one neighboring base station selected by a serving base station, so that a processing quantity is very small, and a load is light.

In a radio communication system, in which radio frequencies for communicating between the radio terminal and each of the radio base stations are different, a table is prepared beforehand in the base station controller, the table stores therein positional information items of the base stations, information items of frequencies used for transmissions/receptions to/from the radio terminals and decision conditions in handoff operations, as to the respective base stations; and the base station controller selects when the positional information is received from the radio terminal, the base station being a handoff candidate on the basis of the positional information of the radio terminal, the positional information items of the respective base stations and the decision condition in the handoff operation, with reference to the table, and transmits a handoff request message in which the information of the frequency of the base station being the handoff candidate is contained, to the radio terminal through the base station communicating with the radio terminal.

More details, threshold values of distances between the radio terminal and the respective base stations, and threshold values of power values of radio signals from the respective base stations at the radio terminal are set for the respective base stations as the handoff decision conditions stored in the table;

the base station controller obtains distances between the radio terminal and the respective base stations from the positional information received from the radio terminal and the positional information items of the respective base stations stored in the table, and compares obtained distances with the threshold values of the distances set for the respective base stations;

in a case where any of the obtained distances is equal to or less than the threshold value of the distance of corresponding base station, the base station controller sets the corresponding base station as the base station of the handoff candidate and commands the radio terminal to alter a frequency thereof to the frequency of the base station of the handoff candidate by transmitting the handoff request message;

the radio terminal having received the handoff request message, alters the frequency in compliance with command, and measures a power value of a radio signal from the base station of the handoff candidate and notifies the base station controller of the power value through the base station communicating with the radio terminal; and the base station controller refers to the table and, in a case where the notified power value is equal to or more than the threshold value of the power value of the base station of the handoff candidate stored in the table, the base station controller controls the radio terminal to hand off to the base station of the handoff candidate.

According to the present invention, it is possible to realize appropriate and efficient handoff even in a system in which a large number of base stations of different frequencies exist. According to the invention, it is possible to provide a method in which an access terminal need not search all neighboring base stations, but it may search one neighboring base station selected by a serving base station, so that a processing quantity is very small, and a load is light.

DESCRIPTION OF THE PREFERRED EMBODIMENTS

Now, embodiments of the present invention will be described.

The embodiments below will be described by exemplifying a case where "1xEV-DO Rev. A" is employed as a radio communication scheme.

A "1xEV-DO Rev. A" system is a system which is capable of the maximum reverse communication of 1.8 Mbps and the maximum forward communication of 3.1 Mbps. This system has a higher degree of adaptive modulation coding as compared with an "EV-DO Rev. 0" system being the system of the last version, and it copes also with multicast "QoS".

Figure 1:
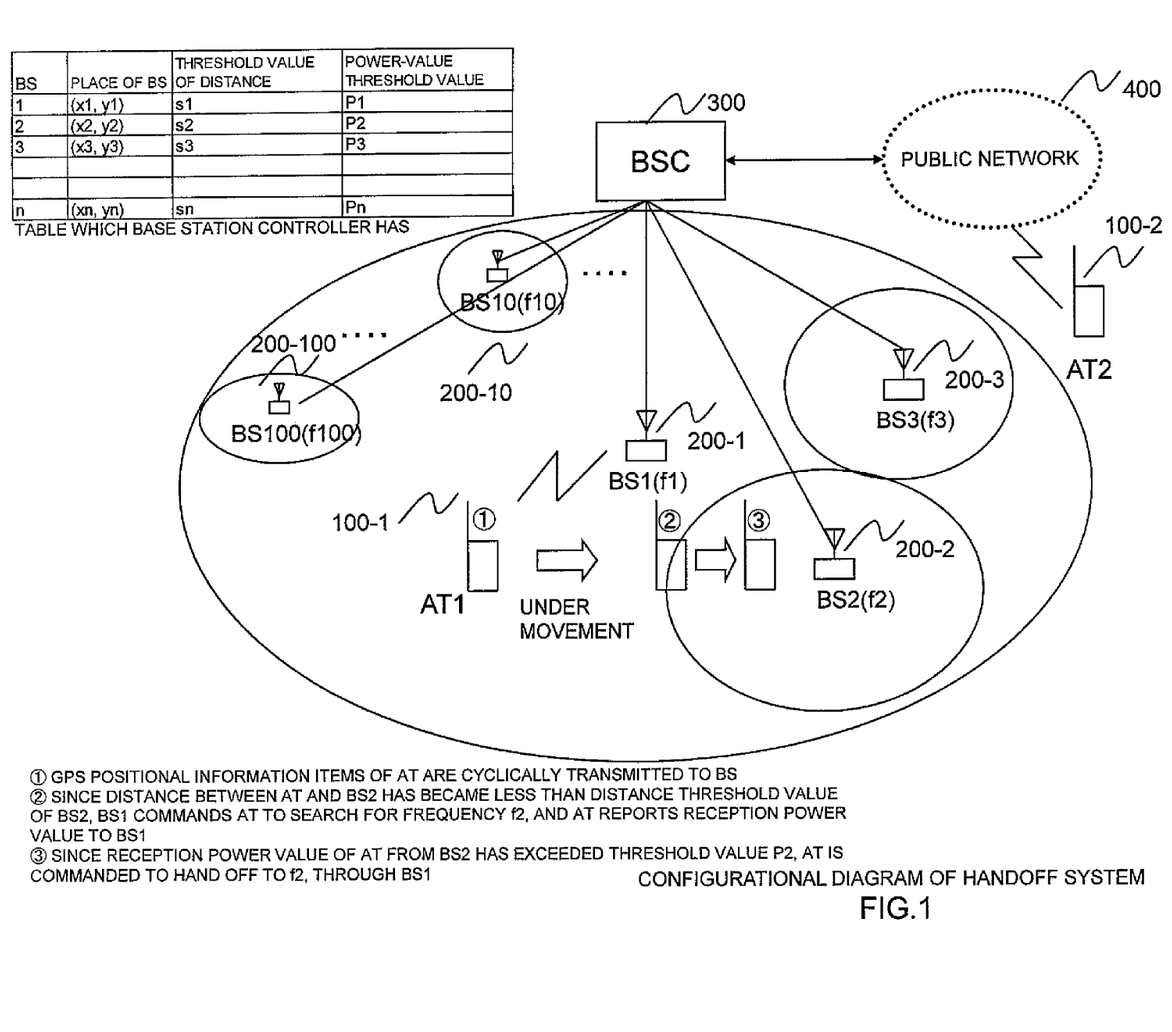
FIG. 1 is a diagram for explaining the configuration of the whole radio communication handoff system to which the present invention is applied.

FIG. 1 is a block diagram of a radio communication system to which the invention is applied.

Referring to FIG. 1, an access terminal 100-1 is connected with a base station 200-1 within a reception area, by a traffic channel, and it can communicate with an access terminal 100-2 through a public network 400 from a base station controller (BSC) 300. During its communication with the base station 200-1, the access terminal 100-1 reports its own positional information items (a longitude and a latitude) cyclically obtained from a GPS, to the base station controller 300 through the base station 200-1. Regarding each of subordinate base stations, the base station controller 300 has positional information items, information on a transmission frequency, and information items on the threshold values of a distance and a power value for determining whether or not handoff is required. In addition, the base station controller 300 computes the distances between the access terminal 100-1 and the respective neighboring base stations 200-1, 200-2, 200-3, . . . , and 200-100 by using the positional information items reported from the access terminal and the positional information items of the neighboring base stations as are stored in a memory included in the base station controller, and it compares the computed distances with the threshold values of the distances as are stored in the memory.

There will be described a case where the access terminal 100-1 is moving toward the base station 200-2.

It is assumed that the distance between the access terminal 100-1 and the base station 200-2 has become less than the threshold value s2 at a certain point of time in the course in which the access terminal 100-1 is moving toward the base station 200-2. The base station controller computes the distance of the access terminal from each neighboring base station, on the basis of the cyclic report of the positional information from the access terminal. Thus, the base station controller 300 detects that the distance between the access terminal 100-1 and the base station 200-2 has become less than the threshold value s2, and it commands the access terminal 100-1 to search for the frequency f2 of the base station 200-2.

The access terminal 100-1 receives the search command from the base station controller 300, it obtains the frequency information of the base station 200-2, and it switches the frequency of hardware inside this access terminal, to the frequency f2. After the switching, the access terminal 100-1 receives the pilot signal of the base station 200-2.

The access terminal 100-1 having received the pilot signal reports the pilot reception power value of the base station 200-2 to the base station controller 300 through the communicating base station 200-1. Then, the base station controller 300 compares the power value of the base station 200-2 as received from the access terminal 100-1 and the power-value threshold value p2 stored in the memory within this base station controller 300.

In a case where the power value of the base station 200-2 as received from the access terminal 100-1 is, at least, equal to the threshold value p2, the base station controller 300 commands the access terminal 100-1 to hand off to the base station 200-2. In addition, the connection between the access terminal 100-1 and the base station 200-1 is cut off, and the connection of the access terminal 100-1 with the base station 200-2 is started.

On the other hand, in a case where the power value of the base station 200-2 as received from the access terminal 100-1 is less than the threshold value p2, the access terminal 100-1 returns to the frequency f1 of the base station 200-1, and its connection with the base station 200-1 is continued.

Next, the configuration of the access terminal will be described.

Figure 2:
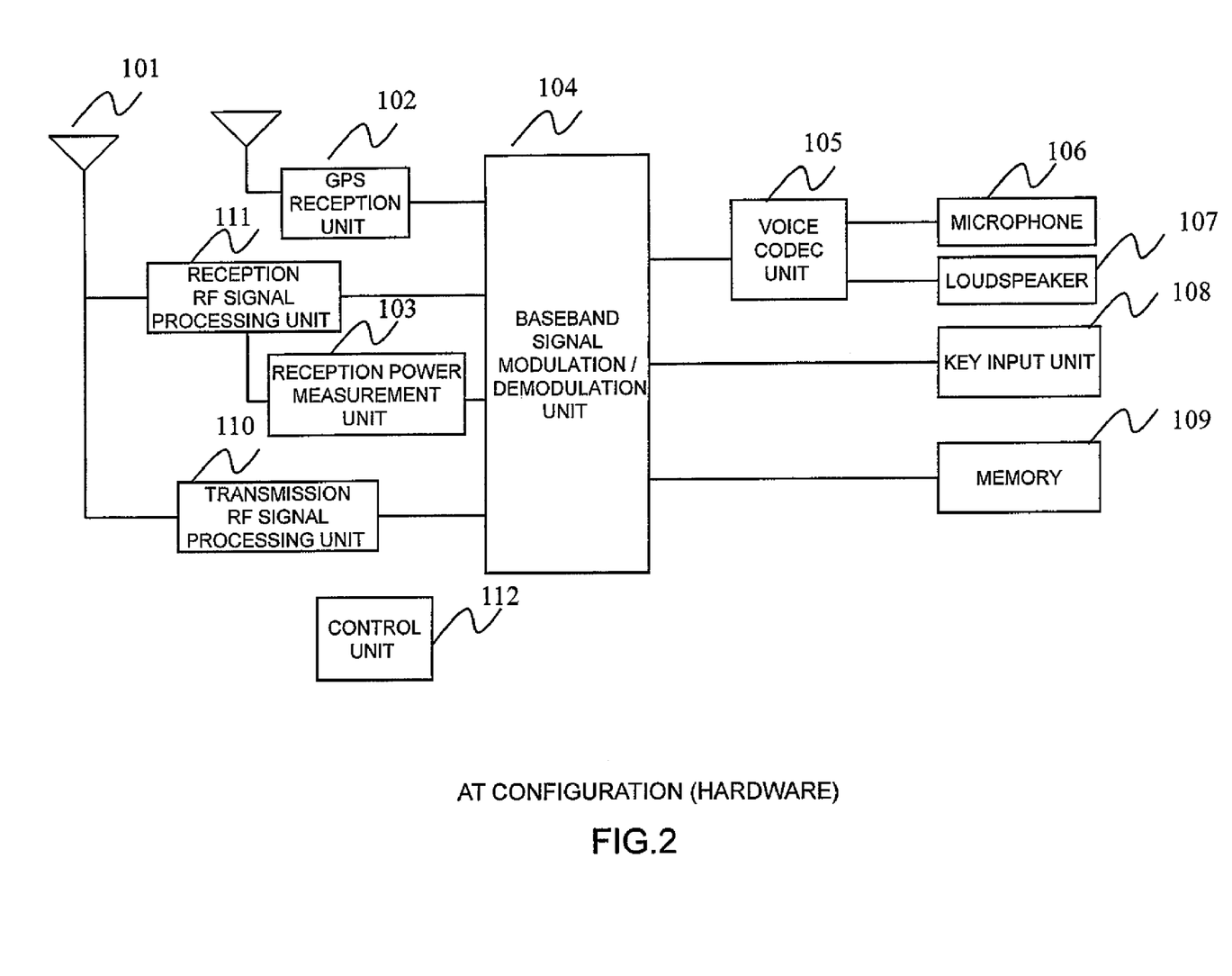
FIG. 2 is a diagram for explaining the hardware configuration of a radio access terminal in one embodiment of the invention.

FIG. 2 is a diagram for explaining the hardware configuration of the access terminal.

The access terminal includes an antenna 101 which transmits a radio-frequency signal, a reception RF signal processing unit 111 which receives and processes a radio-frequency signal and, a transmission RF signal processing unit 110, in order to transmit and receive radio waves between it and the base station. Besides, the access terminal includes a GPS reception unit 102 which detects the current position (a latitude and a longitude) of the access terminal 100-1 itself in such a way that a GPS (Global Positioning System) satellite signal is received by a GPS antenna and then analyzed. Further, the access terminal includes a reception power measurement unit 103 which measures the power of the received signal, a baseband signal demodulation/modulation unit 104 which modulates/demodulates the radio signal so as to convert this radio signal into a baseband signal of low frequency, a voice codec unit 105 which converts a data signal into a voice signal, a microphone 106 which outputs an inputted voice to the voice codec 105 as an electric signal, a loudspeaker 107 to which the electric signal of the voice outputted from the voice codec 105 is inputted so as to be outputted as a voice therefrom, a memory 109, a key input unit 108 with which a manipulator performs manipulations such as the connection and cutoff of vocal speeches, and a control unit 112 which controls the respective portions. The access terminal obtains the frequency information items of the base stations, and the frequency for communication set at the hardware within the access terminal can be switched under the control of the control unit 112.

Next, the configurations of the base station and the base station controller will be described.

Figure 3:
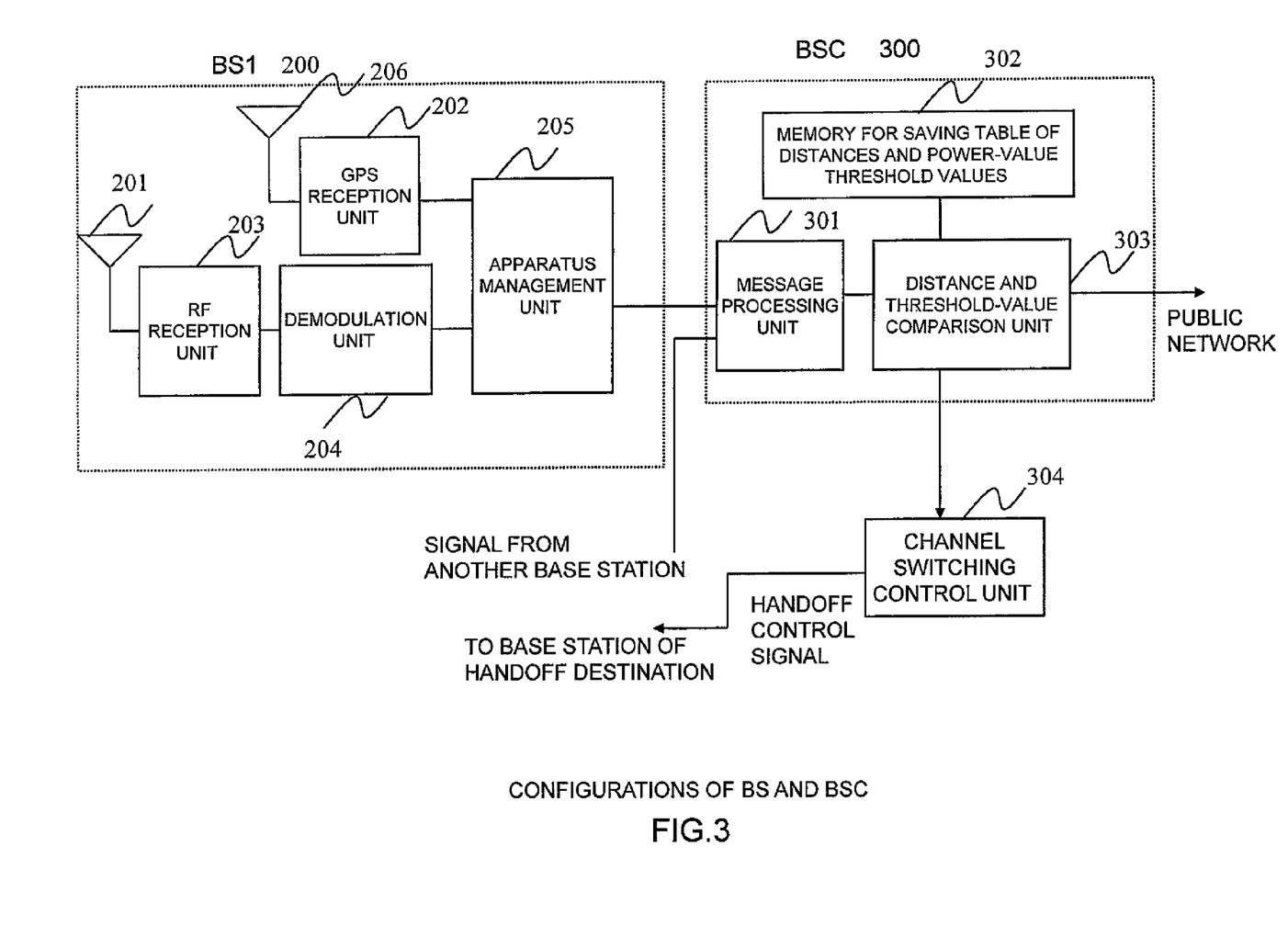
FIG. 3 is a diagram for explaining the configurations of a radio base station and a base station controller in one embodiment of the invention.

FIG. 3 is a diagram showing the configurations of the base station and the base station controller.

The base station 200 includes an antenna 201 which receives a radio signal from the access terminal within an area covered by the pertinent base station, a GPS reception antenna 206 which receives the GPS satellite signal, a GPS reception unit 202 which analyzes the signal received from the GPS reception antenna 206, so as to acquire the positional information items of the base station itself, an RF reception unit 203 which receives the signal of a radio frequency, a modulation/demodulation unit 204 which modulates/demodulates the signal of the radio frequency so as to convert this signal into the signal of the low frequency, and an apparatus management unit 205 which stores therein software items for the management of the whole apparatus and the connection thereof with a maintenance terminal, and the software items of the individual packages of the base station.

Besides, the base station controller 300 comprises a message processing unit 301 which processes individual messages from the respective base stations and which derives any corresponding message as may be needed, a memory 302 which stores therein the threshold value table of the positional information items, positional threshold values and power values of the subordinate base stations of the base station controller, a distance and threshold-value comparison unit 303 which obtains the positional information items of the access terminal so as to compute the distances between the access terminal and the respective base stations and to compare the threshold values with respect to the respective base stations, and a channel switching control unit 304 which issues a handoff control signal to the base station of a handoff destination.

How the handoff in the invention is performed between the system and the apparatus of the above configurations will be described below by indicating examples, and the outline of the examples of a handoff sequence in the invention will be initially explained briefly.

First, the access terminal AT transmits the positional information items of the GPS to the base station controller through the base station with which this access terminal is cyclically communicating, by a route update message by way of example.

The base station controller computes the distances between the access terminal and the individual neighboring base stations, on the basis of the above GPS positional information items of the access terminal AT and the positional information items of the neighboring base stations as are stored in the table retained in the base station controller. When, as the result of the computation, the access terminal has become near to the distance threshold value with regard to the base station n, the base station controller transmits the frequency, the PN information, etc. of the base station n to the access terminal, by a route update request message by way of example.

The access terminal having received this message switches the frequency to the frequency of the base station n, and it searches for the pilot signal of the base station n. In addition, the access terminal transmits the power value of the pilot searched for, to the base station controller via, for example, the base station with which this access terminal is communicating by the route update message.

The base station controller compares the power value of the pilot as sent from the access terminal, with the power threshold value of the base station n. When the threshold value has been exceeded, the base station controller commands the access terminal to hand off to the base station n. The access terminal is assigned the traffic channel of the base station n in such a way, for example, that the base station transmits a traffic channel assignment message to the access terminal. Thus, the access terminal starts communications with the base station n. Here, the access terminal transmits a traffic channel complete message response to the base station n.

In the invention, the BSC (base station controller) has the memory which retains the table of the distance threshold values and power threshold values between the access terminal and the respective base stations, and the distance threshold values and the power threshold values which are set in the retained table are determined by the cell radii of the respective base stations. Therefore, the handoff threshold values can be set more flexibly than in the present-day "1xEV-DO Rev. A" system. Now, the examples will be described by indicating sequence diagrams and the formats of the messages.

OPERATION EXAMPLE 1

Figure 4:
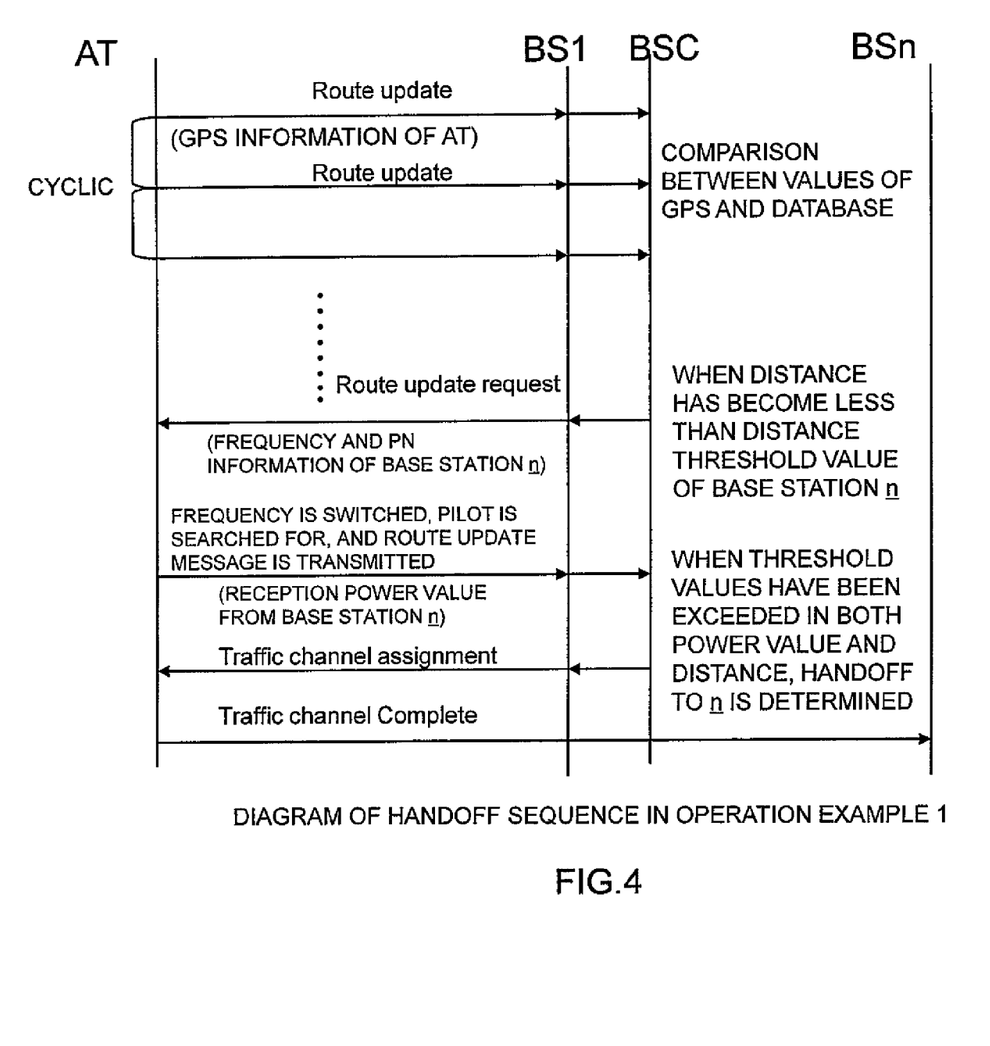
FIG. 4 is a diagram for explaining a handoff sequence in operation example 1 of the invention.

FIG. 4 is the diagram for explaining the processing sequence in one example of the invention.

The access terminal AT cyclically puts the GPS positional information items of its own on the route update message, and transmits them to the base station controller through the base station BS1.

One of features of the invention is the route update message. For the sake of comparison, a route update message in the related art will be first explained.

Table 1 shows the format of the related-art route update message. The route update message contains the ID and No. of this route update message, the number of the pilots received by the access terminal, the PN No. of the pilot, the reception strength of the pilot, etc.

TABLE 1

| FIELD | NUMBER OF BITS | OUTLINE |
|---|---|---|
| Message ID | 8 | Route Update Message ID |
| Message Sequence | 8 | Route Update Message No. |
| Reference Pilot PN | 9 | PN No. of Reference pilot |
| Reference Pilot Strength | 6 | Reception strength of Reference pilot |
| Reference Keep | 1 | |
| Num Pilots | 4 | Number of Pilots |
| Pilot PN Phase | 15 | |
| Channel Included | 1 | |
| Channel | 0 or 24 | |
| Pilot Strength | 6 | Reception strength of Above pilot |
| Keep | 1 | |
| Reserved | Variable | |

On the other hand, the route update message in one example of the invention is shown in Table 2. When compared with the format of the related-art route update message as shown in Table 1, the format of the route update message in the example of the invention increases 8 bits as each of the longitude and latitude of the access terminal as represent the positional information thereof. In this example, the access terminal cyclically puts the positional information items on the route update message and transmits them to the base station controller through the base station.

TABLE 2

| FIELD | NUMBER OF BITS | OUTLINE |
|---|---|---|
| Message ID | 8 | Route Update Message ID |
| Message Sequence | 8 | Route Update Message No. |
| Reference Pilot PN | 9 | PN No. of Reference pilot |
| Reference Pilot Strength | 6 | Reception strength of Reference pilot |
| Reference Keep | 1 | |
| Num Pilots | 4 | Number of Pilots |
| Pilot PN Phase | 15 | |
| Channel Included | 1 | |
| Channel | 0 or 24 | |
| Pilot Strength | 6 | Reception strength of Above pilot |
| Keep | 1 | |
| Reserved | Variable | |
| Latitude | 8 | Latitude of Access terminal AT |
| Longitude | 8 | Longitude of Access terminal AT |

The base station controller which has received the positional information items stored in the route update messages cyclically transmitted from the access terminal, compares the received positional information items of the access terminal and the positional information items of the respective base stations as stored in the table which this base station controller has.

The base station controller evaluates the distance between the position of the access terminal and the nth base station n. When the distance has become less than the predetermined threshold value, the base station controller puts the frequency and PN information of the base station n on the route update request message and transmits them to the access terminal AT.

Table 3 shows the route update message for notifying the frequency and PN information of the base station n to the access terminal. This table indicates some parameters in the route update request message. The route update request message is a message which is transmitted from the base station to the access terminal. This message contains the longitude and latitude of a sector as denote the position of the sector, the number of neighboring base stations, the PN code of the neighboring base station, the frequency of the neighboring base station, etc.

TABLE 3

| PARAMETER | COMMENT |
|---|---|
| Latitude | Latitude of Sector |
| Longitude | Longitude of Sector |
| Route Update Radius | |
| Num Neighbors | Number of Neighboring base stations |
| Neighbor PN | PN code of Neighboring base station |
| Neighbor Channel Included | |
| Neighbor Channel | Frequency of Neighboring base station |

The access terminal can know the frequency of the neighboring base station from the route update request message.

The access terminal having received the route update message switches the reception frequency of its own to the frequency of the base station n, and it searches for the pilot signal of the base station n.

The access terminal AT transmits the reception power value by the route update message. When both the reception power value and the distance from the base station n have exceeded their respective threshold values, the base station n assigns the traffic channel to the access terminal AT and completes the handoff.

Table 4 shows an example of the format of the message which notifies the assignment of the traffic channel to the access terminal. Which of the channels the base station assigns to the access terminal, is known from this message. The MACID of the sector to be assigned to the access terminal AT is contained in the traffic channel assignment message.

TABLE 4

| FIELD | NUMBER OF BITS | OUTLINE |
|---|---|---|
| Message ID | 8 | |
| Message Sequence | 8 | |
| Channel Included | 1 | |
| Channel | 0 or 24 | |
| Frame Offset | 4 | |
| DRC Length | 2 | |
| DRC Channel Gain | 6 | |
| Ack Channel Gain | 6 | |
| Num Pilots | 4 | |
| Pilot PN | 9 | |
| Softer Hand off | 1 | |
| MAC Index | 6 | ID of Sector to be assigned to Access terminal AT |
| DRC Cover | 3 | |
| RAB Length | 2 | |
| RAB Offset | 3 | |

OPERATION EXAMPLE 2

Next, another example will be described.

Figure 5:
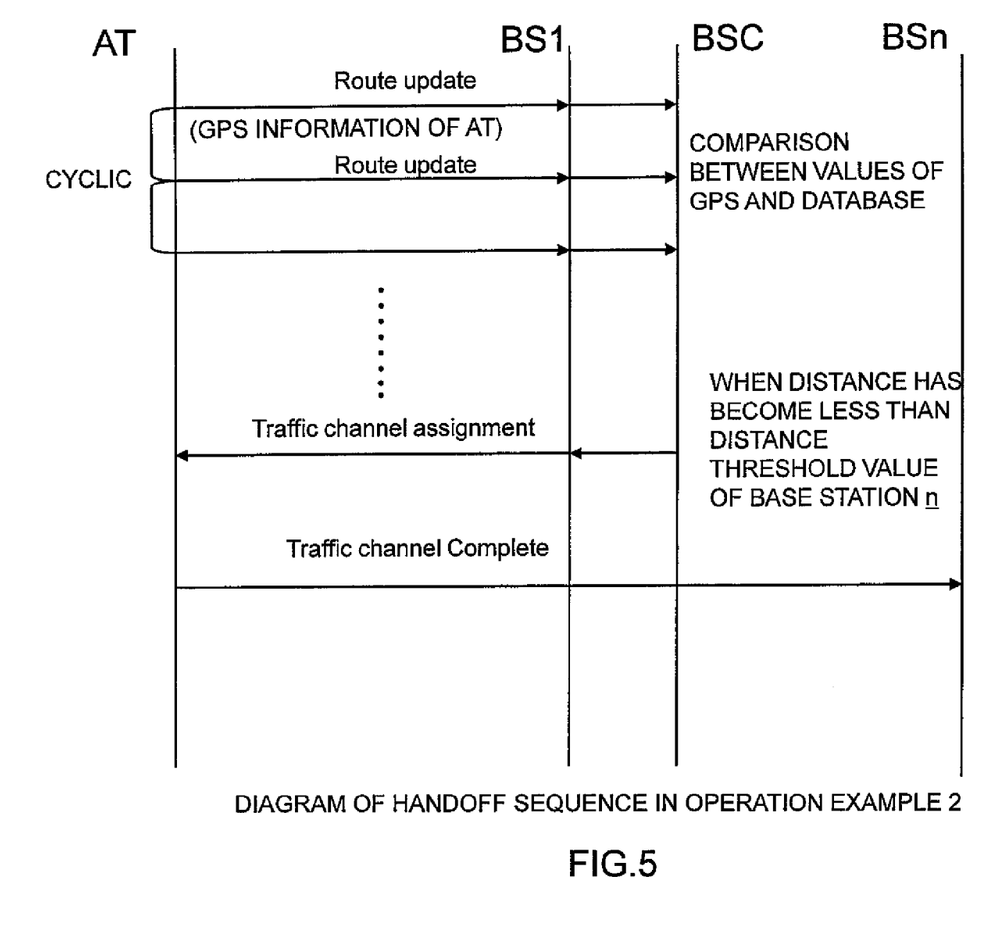
FIG. 5 is a diagram for explaining a handoff sequence in operation example 2 of the invention.

FIG. 5 is the diagram for explaining the processing sequence in another example of the invention.

Also in operation example 2, in the same manner as in operation example 1, the access terminal AT cyclically puts the GPS positional information items of its own on the route update message and transmits them to the base station controller through the base station BS1.

The base station controller which has received the positional information items transmitted from the access terminal AT, compares the received positional information items of the access terminal with the distance threshold value of the table stored in this base station controller. In a case where, as the result of the comparison, the distance has become less than the distance threshold value of the base station n, the base station controller commands the access terminal AT to hand off to the base station n and assigns the traffic channel to the access terminal AT. The access terminal switches the frequency to the frequency of the base station n, and it sends the traffic channel complete message to the base station after the completion of the handoff.

The traffic channel complete message which the access terminal transmits to the base station after the completion of the handoff, is shown in Table 5. After having received the traffic channel assignment message in Table 4, the access terminal transmits the response message of the traffic channel completion to the base station which is the handoff destination.

TABLE 5

| FIELD | NUMBER OF BITS | OUTLINE |
|---|---|---|
| Message ID | 8 | Message ID(0x02) |
| Message Sequence | 8 | |

What is claimed is:

1. A handoff control method in a radio communication system having a plurality of radio terminals, a plurality of base stations which perform radio communications with the radio terminals, and a base station controller which controls the base stations, wherein, in a cover range of a first base station among the radio terminals, a plurality of second base stations each having a cover range smaller than the cover range of the first base station exist and, radio frequencies with which the base stations communicate with the radio terminals are allowed to differ in the radio communication system, wherein:

each of the plurality of radio terminals, which has a positional information detection unit, transmits positional information which includes longitude and latitude of own radio terminal detected by the positional information detection unit, to the base station controller through a base station communicating with the own radio terminal by a first route update message;

a table is prepared beforehand in the base station controller, the table stores therein positional information items of the plurality of base stations connected to own base station controller, information items of frequencies used for transmissions/receptions between the plurality of radio terminals and the plurality of base stations, and decision conditions in handoff operations set for the respective base stations, the decision conditions including threshold values of distances between the radio terminals and the respective base stations, and threshold values of power values of radio signals received by the radio terminals from the respective base stations; and the base station controller, when receiving the positional information from one radio terminal among the plurality of radio terminals by the first route update message through the radio base station communicating with the radio terminal, refers to the table to obtain distances between the radio terminal and the respective base stations based on the positional information received from the radio terminal and the positional information items of the respective base stations stored in the table, and compares obtained distances with the threshold values of distances set for the respective base stations;

the base station controller, when finding the obtained distance which is equal to or less than threshold value of distance for a corresponding base station, sets the corresponding base station as the base station of the handoff candidate, and commands the radio terminal to alter a frequency thereof to the frequency of the base station of the handoff candidate by transmitting a handoff request message;

the radio terminal having received the handoff request message, alters the frequency in compliance with command, and measures a power value of a radio signal from the base station of the handoff candidate and notifies the base station controller of the power value, by transmitting a second route update message including the power value through the base station communicating with the radio terminal; and the base station controller refers to the table and, in a case where notified power value is equal to or more than the threshold value of the power value for the handoff candidate stored in the table, the base station controller controls the radio terminal to handoff to the base station of the handoff candidate.

\* \* \* \* \*